United States Patent [19]

Schmitz

[11] Patent Number: 4,491,774
[45] Date of Patent: Jan. 1, 1985

[54] CONTROL SYSTEM FOR A RADIO-CONTROLLED DOOR OPERATOR

[75] Inventor: Charles J. Schmitz, Arlington Heights, Ill.

[73] Assignee: Motorola, Inc., Schaumburg, Ill.

[21] Appl. No.: 566,941

[22] Filed: Dec. 30, 1983

[51] Int. Cl.³ .............................................. H02P 1/40
[52] U.S. Cl. .................................... 318/282; 318/466
[58] Field of Search ................ 318/466, 467, 468, 282

[56] References Cited

U.S. PATENT DOCUMENTS

| | | | |
|---|---|---|---|
| 2,295,355 | 9/1942 | Prescott | 318/468 X |
| 3,178,627 | 4/1965 | Houk | 318/468 X |
| 3,993,940 | 11/1976 | Volk, Jr. | 318/468 X |
| 3,996,591 | 12/1976 | Hayward | 292/3 |
| 4,142,137 | 2/1979 | Umpleby et al. | 318/16 X |
| 4,394,605 | 6/1983 | Terazawa | 318/256 X |

*Primary Examiner*—William M. Shoop
*Assistant Examiner*—Bentsu Ro
*Attorney, Agent, or Firm*—Margaret M. Parker; James W. Gillman

[57] ABSTRACT

A radio-controlled door operator system includes a reversible AC motor and lamp. Power is supplied to the motor and lamp by a pair of power control relays each having two single-pole double-throw contacts. Actuation of one relay results in clockwise rotation of the motor and lighting of the lamp. Actuation of the other relay results in counter-clockwise rotation of the motor and lighting of the lamp. Actuation of both relays results in lighting of the lamp only. Three different active operating states are thus established by the two relays.

4 Claims, 3 Drawing Figures

| FUNCTION | LOGIC STATE | |
|---|---|---|
| | A | B |
| OFF | 0 | 0 |
| UP AND LAMP | 0 | LOW |
| DOWN AND LAMP | LOW | 0 |
| LAMP ONLY | LOW | LOW |

CONTROL SYSTEM FOR A RADIO-CONTROLLED DOOR OPERATOR

BACKGROUND OF THE INVENTION

The present invention is directed generally to radio-controlled door operator systems, and more particularly to an improved control system for use therein.

Radio-controlled door operator systems, such as utilized for opening and closing garage doors and the like, typically utilize a reversible AC motor to power a mechanical linkage attached to the door. Power is supplied to tne motor by means of motor control relays within the operator. For long term system reliability, these relays must have relatively large contacts of sufficient current carrying capacity to handle the starting and running loads of the motor.

In addition, the door operator may include an internal light for lighting the area underlying the door. This light, which is typically of a 60 to 100 watt size, is typically supplied with power through a lamp control relay within the door operator. This relay, like the motor control relays, must have relatively large contacts to handle the current requirement of the lamp.

The motor and lamp control relays are actuated by signals developed by a door control circuit, which may be mounted either within the door operator housing or at a remote location, and which may include an RF receiver for receiving radio signals sent by a hand-held or vehicle-mounted transmitter. Control signals are applied to the relays through an interconnecting multi-conductor cable.

Because of the relatively high cost of relays having adequate current carrying capacity for the motor and lamp functions, and because of the cost of installing and connecting such relays, it is desirable that the number of such power control relays used in a door operator control system be minimized. Prior door operator systems utilized three relays for motor and lamp control; two relays for supplying power to the motor in respective clockwise and counterclockwise directions, and one relay for supplying power to the lamp. The present invention is directed to a door operator control system which utilizes only two relays for motor and lamp control. This provides not only a reduction in the number of control relays, but also a reduction in the number of interconnections required between the control unit and the operator.

Accordingly, it is a general object of the present invention to provide a new and improved radio-controlled door operator system.

It is another general object of the present invention to provide a door operator system which is less costly to manufacture.

It is another object of the present invention to provide a door operator control system which requires a lesser number of motor and lamp control relays and associated circuitry.

SUMMARY OF THE INVENTION

The invention is directed to a door operator control system for use in conjunction with a motor driven door operator and light system. The control system includes a first control relay having at least first and second sets of contacts, a second control relay having at least first and second sets of contacts, and interconnection means for interconnecting the contacts and the motor whereby the motor operates in one direction upon actuation of the first relay, and the motor operates in the other direction upon actuation of the second relay, and only the light operates upon actuation of both relays.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Figures 1, 3:
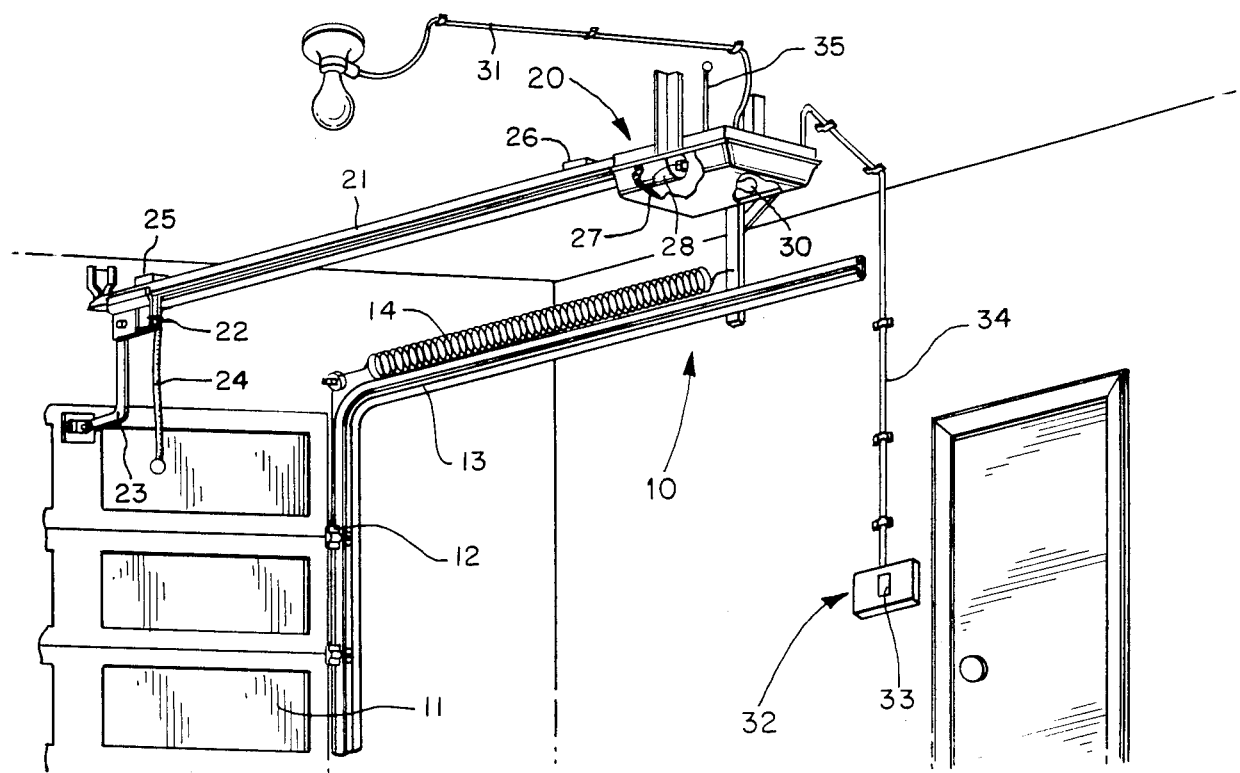
FIG. 1 is a perspective view of a radio-controlled door operator system incorporating a control system in accordance with the invention.
FIG. 3 is a logic table illustrating certain functions of the control system.

Referring to the Figures, and particularly to FIG. 1, a radio-controlled door operator system 10 constructed in accordance with the invention is shown in conjunction with an overhead garage door 11 of conventional construction. In accordance with conventional practice, the door 11 comprises a plurality of horizontally hinged door sections, mounted at their ends by means of rollers 12 to a guide rail 13. As the door is raised, the door sections follow rail 13 until the door reaches a horizontal position clear of the door opening. A spring 14 may be provided in conjunction with a wire and pulley arrangement to counter-balance the weight of the door and thereby reduce the effort required to open the door.

The door operator control system 10, in accordance with conventional practice, comprises an operator unit 20 mounted to a ceiling or other appropriate supporting structure immediately in front of (as viewed in FIG. 1) the horizontal track of the door. Mechanical force is applied to door 11 by operator unit 20 by means of an actuator rail assembly 21 extending from the operator over the track of the door. In accordance with conventional practice, a carriage assembly 22 slidably mounted on rail 21 is driven along the rail by means of a jack-screw, chain or other appropriate mechanical arrangement (not shown) within the actuator rail upon operation of operator unit 20.

To provide for movement of door 11 between closed and open positions, the door is attached to carriage 22 by means of a link 23 pivotably mounted at one end to the top edge of the door. The other end of the link is pivotably attached to carriage 22, so that when the carriage is drawn toward door operator unit 20 by actuation of the operator unit, door 11 is caused to follow the track defined by guide rails 13 to a fully retracted position. A release mechanism (not shown) within carriage 22 may be activated by pulling a cable 24 to release the door from the operator unit in the event that manual operation of the door becomes necessary.

To limit the travel of carriage 22, and hence the travel of door 11, operator unit 20 is provided with, in accordance with conventional pratice, a pair of limit switches 25 and 26. Limit switch 25 is actuated by carriage 22 when door 11 reaches its fully down position.

Limit switch 26 is actuated by carriage 22 when door 11 reaches its full up position. In either case, actuation of the limit switch interrupts the operation of door operator unit 20.

As a further precaution against uncontrolled door movement, a clutch-actuated safety switch 27 is provided within operator unit 20 in association with the motor 28 provided for raising and lowering the door. Basically, this clutch-actuated switch senses a change in the torque loading of the motor, such as may result from an obstruction in the path of the door or from the door reaching the limit of its travel in the event of limit switch failure, to immediately interrupt operation of the door operator.

In further accord with conventional practice, the door operator unit 20 may include a light source 30 of relatively high wattage, typically in the range of 60 to 100 watts. This light source provides light in the area below the door, assisting the user in performing an activity such as entering or leaving an automobile. Operating power is supplied to operator unit 20 by a power cable 31 connected to a convenient source of AC electrical power.

To provide for local operation of the door operator the door operator system 10 of the invention includes a wall-mounted control unit 32. This control unit may include a user actuable control button 33 for initiating operation of the door; either from a closed position to an open position, or from an open position to a closed position. A multi-conductor cable 34 may be provided for connecting the control unit 32 to the actuator unit 20. Where the operator system includes radio control capability, the door operator 20 may incorporate RF receiver circuits and an antenna 35 associated therewith.

Figure 2:
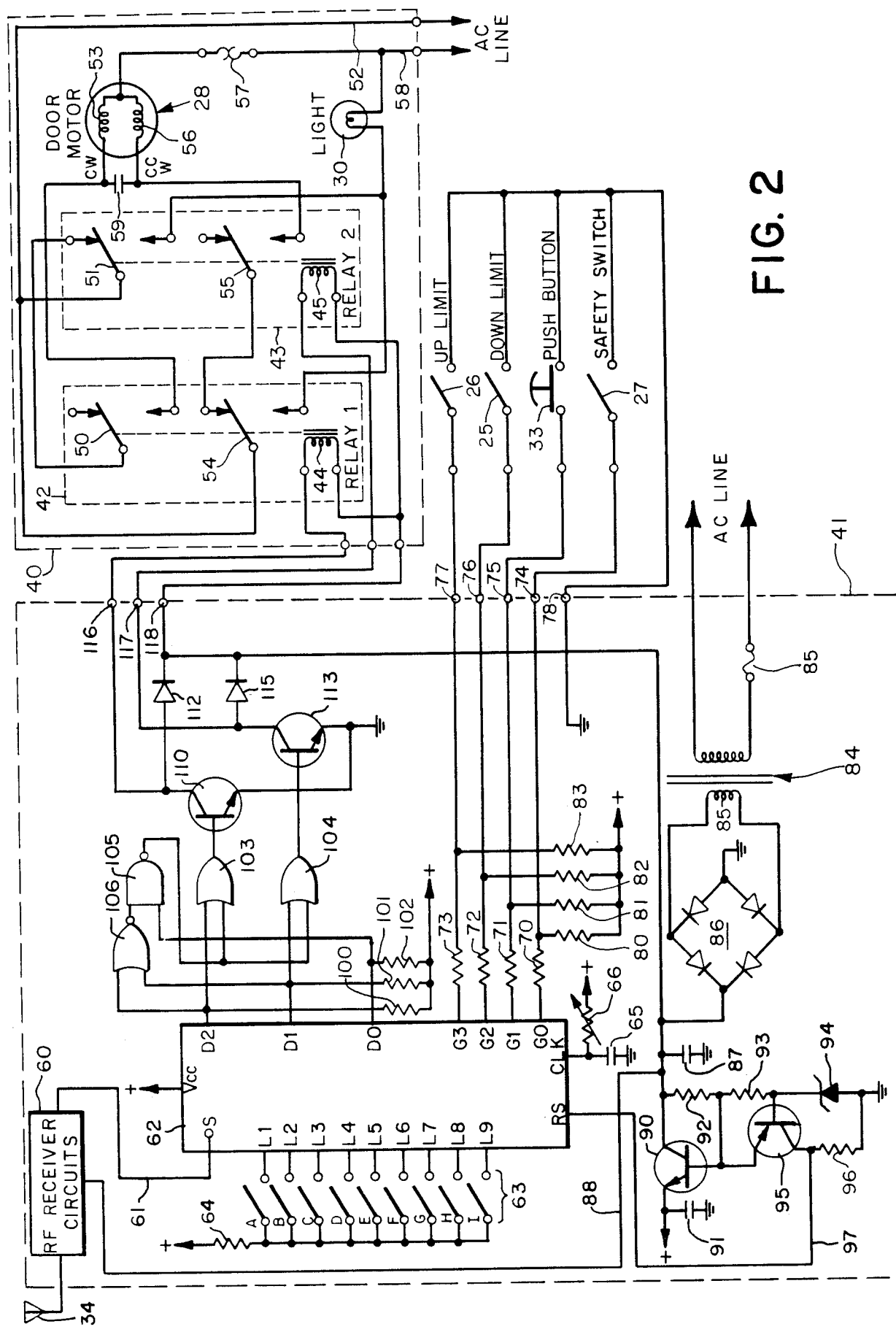
FIG. 2 is a simplified schematic diagram of the control system of the door operator shown in FIG. 1.

Referring to FIG. 2, the door operator control system utilized in the door operator system 10 is seen to comprise a motor control circuit 40, which provides operating power to door motor 28 and light 30, and a remote control circuit 41, which functions to receive and decode a radio frequency command signal and to generate appropriate command signals for application to operator control circuit 40. In practice, the two circuits may be constructed on separate printed wiring boards, with necessary interconnections being made through connecting cables. In a typical door operator system construction control circuit 40 is contained within operator unit 20 to provide for convenient connection of power circuits to motor 28 and light 30. Control circuit 41 may be located either in the operator unit 20, as shown in the present embodiment, or may be located in the remotely mounted control unit 32.

To provide for control of door motor 28 and light 30, the motor control board 40 includes, in accordance with the invention, a pair of double-pole double-throw power control relays 42 and 43. The relays 42 and 43 are shown in FIG. 2 in the non-energized position. These relays, which include contacts of sufficient current carrying capacity to handle the starting and running current of motor 28, and the current requirements of light 30, are preferably of a rugged long-life construction. Relay 42 includes an actuator coil 44 operable from a low voltage applied AC current, such as 24 volts in the illustrated embodiment. Similarly, relay 43 includes an actuator coil 45 operable from an applied current of the same voltage level.

To provide for simultaneous control of motor 28 and light 30, the transfer contact of a first contact set 50 of relay 42 is connected to the normally closed contact of a first contact set 51 of relay 43. The transfer contact of contact set 51 is connected to a conductor 52 connected to one side of the AC line. The normally open contact of contact set 50 is connected to the clockwise winding 53 of motor 28. The normally open contact of contact set 51 is connected to one terminal of light 30.

The transfer contact of a second contact set 54 of relay 42 is connected to the AC line through conductor 52. The normally closed contact of contact set 54 is connected to the transfer contact of a second contact set 55 of relay 43. The normally open contact of contact set 54 is connected to light 30. The normally open contact of contact set 55 is connected to the counter-clockwise winding 56 of motor 28. The remaining ends of motor windings 53 and 56 are connected together and through a circuit breaker 57 and a conductor 58 to the other side of the AC line. The remaining contact of light 30 is also connected to the AC line by conductor 58.

Thus connected, relays 42 and 43 provide, in accordance with the invention, for the control of both door motor 28 and light 30. Specifically, and as illustrated in FIG. 3, when neither relay is energized no power is applied to either motor 28 or light 30. When only relay 42 is energized, power is supplied through contact set 50 to the clockwise windings 53 of motor 28, causing the motor to raise door 11. At the same time, power is supplied to lamp 30 through contact set 54, causing the light to light concurrently with operation of the motor.

When only relay 43 is energized, power is supplied to light 30 through contact set 51. At the same time, power is supplied through contact set 55 to the counter-clockwise winding 56 of motor 28, causing the motor to close door 11.

When both relays are actuated no current is supplied to door motor 28. However, current is supplied to light 30 through the lower contact of contact set 51 and through the normally open contact of contact set 54 of relay 42.

Thus, four distinct operating modes can be selected by selective energization of relays 42 and 43. This provides a significant simplification of motor control circuit 40 and reduction in the number of control lines required between circuits 40 and 41.

Within door operator unit 20, the door operator control system of the present invention may include RF receiver circuits 60. These circuits, which may be conventional in construction and operation, operate in conjunction with antenna 34 to produce on a signal line 61 a series of coded binary signals corresponding to a received radio frequency code transmission. These code signals are applied to the signal input of a processor circuit 62.

Within processor 62, which may, for example, comprise a commercially available type COP410L microprocessor circuit, as manufactured by National Semiconductor Corporation and programmed in accordance with known programming techniques, compares the received code with a binary address code entered into terminals L1-L9 of the processor by means of a multi-section code switch 63. A unidirectional current is supplied to the switch through a resistor 64 such that closure of an individual switch contact results in application of a logic high to the associated input to the processor. By closing selected ones of the switches the user can select a particular code. Only when the incoming code on line 61 corresponds to this predetermined code will the processor 62 respond to the received signal.

The operation of processor 62 is dependent on applied clock pulses developed in part by an RC time constant consisting of a capacitor 65 connected to ground and a variable resistor 66 connected to the system current source.

Operational inputs are applied to processor 62 through input terminals G0–G3. These terminals are connected through resistors 70–73 to four input terminals 74–77 of control circuit 41. A fifth terminal 78 is connected to system ground. In the absence of inputs at terminals 74–77, input terminals G0–G3 are maintained logic high by respective biasing resistors 80–83 connected between terminals 74–77 and the system current source.

Inputs are applied to processor 62 by selective grounding of terminals 74–77. Specifically, to signal to processor 62 that door 11 has reached its up limit, the up limit switch 26 is connected between terminal 77 and terminal 78. Prior to door 11 reaching its up limit, limit switch 26 is open and a positive bias is applied to input terminal G3 through resistors 73 and 83. However, upon door 11 reaching its up limit, switch 26 is closed and terminal 77 is grounded, causing input terminal G3 to become logic low and the processor 62 to recognize a door up limit input.

Similarly, prior to door 11 reaching its down limit, switch 25 is open and input terminal G2 is biased logic high by resistors 72 and 82. Upon the door reaching its down limit, switch 25 closes, applying a logic low to input terminal G2 which causes processor 62 to recognize the door reaching its down limit.

To enable the user to initiate opening or closing of door 11, the push button switch 33 of control unit 32 is connected between terminals 75 and 78. Upon closure of switch 33, a logic low is established at input terminal G1, causing processor 62 to recognize that an opening or closing cycle is to be either initiated or interrupted.

To interrupt operation of the door operator upon the door hitting an object, or upon a limit switch failing to close, the stall detector switch 27 of operator unit 20 is connected between terminals 74 and 78 of control circuit 41. Upon closure of stall detector switch 27 a logic low is applied to input terminal G0, causing processor 62 to recognize that a stall condition has occurred.

Operating power is developed for processor 62 and the other control system components by a transformer 84. The primary winding of this transformer is connected to the AC line through a fuse 85. The secondary winding of this transformer is connected to a full wave bridge rectifier 86 which provides in conjunction with a filter capacitor 87 an unregulated supply current for application on a supply line 88 to receiver circuits 60 and other components of control circuit 41. The unregulated current is also supplied through a series regulator transistor 90 and filter capacitor 91 to those components of control circuit 41 which require regulated voltage source.

In accordance with conventional practice, the conduction level of transistor 90 is varied to maintain a constant voltage level. To this end, the base electrode of transistor 90 is connected to a voltage divider comprising a resistor 92, a resistor 93 and a zener diode 94 connected between the unregulated current source and ground. A control transistor 95 has a base electrode connected to zener diode 94, and principal electrodes connected between the base of transistor 90 and a resistor 96 to ground to control the conduction level of transistor 90 in response to the voltage difference between the regulated source voltage and the reference voltage developed by zener diode 94.

To preclude operation of processor 62 in the event that insufficient voltage is available at the regulated voltage source, the collector of control transistor 95 is connected to an inhibiting input of processor 62 through a control line 97. This precludes the possibility of the processor issuing inappropriate or random operating commands to motor control circuit 40 or responding to improperly coded received radio transmissions.

Processor circuit 62 provides three output signals at terminals D0–D2 of the device. A signal at terminal D0 commands operation of the system light. A signal at terminal D1 commands movement of the door in a down direction. A signal at terminal D2 commands movement of the door in an up direction. The commands appear singly or plurally, as required by applied door position signals and user operating commands. For example, during a door up operation outputs are produced at terminals D0 and D2, since light 30 is required to operate while the door is in motion. Similarly, during a door down operation outputs appear at terminals D1 and D0. After the door has completed its travel, as signalled by actuation of the appropriate one of limit switches 25 and 26, the D1 or D2 output is terminated, and only the D0 output remains for a period of time to keep light 30 lit as a convenience to the user.

With prior garage door operator systems the individual outputs D0–D2 were utilized to control corresponding relays in motor control circuit 40 to control the operation of motor 28 and light 30. However, to accommodate the unique two-relay control circuit of the invention, the D0–D2 outputs of processor 62 are, in accordance another aspect of the invention, converted to appropriate control outputs for application to relays 42 and 43.

In particular, unidirectional operating bias is applied to output terminals D0–D2 by respective ones of resistors 100–102 connected between the terminals and the system current source. The D2 output terminal is connected to one input of an OR gate 103. The D1 output is connected to one input of an OR gate 104. The D0 output is connected to one input of an AND gate 105. Outputs D1 and D2 are also connected to respective inputs of a NOR gate 106. The output of NOR gate 106 is connected to the remaining input of AND gate 105. The output of AND gate 105 is connected to the remaining inputs of OR gates 103 and 104.

The output of OR gate 103 is connected to the base of an output transistor 110. The collector of transistor 110 is connected to the unregulated current source line 88 through relay coil 44 so that upon conduction of the transistor the relay is actuated. A diode 112 connected across the relay coil provides transient suppression in a manner well known to the art.

Similarly, the output of OR gate 104 is connected to the base of an output transistor 113. The collector of this transistor is connected to the unregulated current source line 88 through relay coil 45, which is actuated upon conduction of the transistor. A diode 115 connected across the relay coil provides transient suppression.

Thus connected, processor 62 provides necessary control signals to relays 42 and 43. Specifically, upon the occurrence of a D2 command signal, calling for a door up operation, transistor 110 is biased into saturation by OR gate 103. This energizes relay 42, causing contact set 50 to apply current to the clockwise winding of motor 28 to raise the door. At the same time, contact set 54 causes light 30 to be powered. Occurrence of a D0 lamp on command has no effect, since the D2 output of processor 62 causes NOR gate 106 to apply a logic low inhibit signal to AND gate 105 which prevents that gate from applying the logic high signal to either OR gate 103 or OR gate 104.

Upon the occurrence of a logic low output signal at output terminal D1, calling for a door down operation, OR gate 104 causes transistor 113 to be biased into saturation. This energizes relay 43, causing contact set 51 to apply current to light 30 and contact set 55 to apply current to the counter-clockwise winding of door motor 28. A command signal on output D0 has no effect at this time by reason of the D1 output applied to NOR gate 106, which inhibits AND gate 105 and prevents the application of a logic high to either OR gate 103 or OR gate 104.

Upon the occurrence of a D0 lamp on logic low command signal AND gate 105 is enabled, provided no door open or door closed commands are present at output terminals D1 and D2. The output of AND gate 105 is then applied to both OR gate 103 and OR gate 104, causing these OR gates to bias transistors 110 and 113 into saturation. This causes both motor control relays 42 and 43 to be energized and lamp 30 only to be powered.

Thus, the conventional door open, door close and light on commands provided by processor 62 are converted to relay on-off commands for application to relays 42 and 43. It will be appreciated, however, that with appropriate reprogramming of processor 62 it would be possible to provide output commands from the processor suitable for driving transistors 110 and 113 directly. This would eliminate the need for OR gates 103 and 104, AND gate 105 and NOR gate 106.

The control circuit of the invention, by eliminating the need for an additional power control relay in motor control circuit 40, achieves a significant savings in system cost. Furthermore, by reason of the simplified interconnections, the resulting system is more reliable and easier to maintain.

While a operator system enbodying the invention has been shown in conjunction with an overhead garage door, it will be appreciated that the invention can be utilized in conjunction with operators for many other types of movable objects, such as draperies, louvers and window operators. Furthermore, while the control system of the invention has been shown in conjunction with a radio-controlled door opener, it will be appreciated that the system can be used in conjunction with non-radio wired-remote electric door operator systems, or with local wired electric door operator systems, with equal advantage.

While a particular embodiment of the invention has been shown and described, it will be obvious to those skilled in the art that changes and modifications may be made therein without departing from the invention in its broader aspects, and, therefore, the aim in the appended claims is to cover all such changes and modifications as fall within the true spirit and scope of the invention.

I claim:

1. A door operator control system for use in conjunction with a motor driven door operator and light system including a bidirectional motor and a control unit providing door up, door down and light command signals, comprising:

a first control relay having first and second sets of single-pole double-throw contacts;
a second control relay having first and second sets of single-pole double-throw contacts;
interconnection means connecting said first set of contacts of said first relay with said first set of contacts of said second relay to one direction winding of said motor and to said light, and said second set of contacts of said first relay with said second set of contacts of said second relay to the other direction winding of said motor and to said light, the remaining contacts of said motor and said light being connected to said source, whereby upon actuation of said first relay said motor operates in one direction and said light is powered, upon actuation of said second relay said motor operates in the other direction and said light is powered, and upon actuation of both said relays only said light is powered.

2. A door operator control system as defined in claim 1 including control circuit means for actuating said first and second relays, said control circuit means requiring only three conductors connecting to said relays.

3. A door operator control system as defined in claim 1 wherein said motor includes clockwise and counter-clockwise windings, and said first sets of contacts are connected to said clockwise winding, and said second sets of contacts are connected to said counter-clockwise winding.

4. An electric door actuator comprising:
a reversible motor having first and second opposite direction windings;
a lamp;
a pair of power control relays each having a first contact set comprising a first transfer contact, a first normally open contact, and a first normally closed contact, and a second contact set comprising second transfer contact, a second normally open contact, and a second normally closed contact;
of said relay pair, said first transfer contact of one of said relays being connected to said first normally closed contact of the other relay, said first normally open contact of said one relay being connected to one contact of one winding of said motor, and said first normally open contact of said other relay being conneted to one terminal of said lamp, and said first transfer contact of said other relay being connected to one side of the AC line; and
of said relay pair, the second transfer contact of one of said relays being connected to said one side of the AC line, said second normally open contact of said one relay being connected to said one terminal of said lamp, said second normally closed contact of said one relay being connected to said second transfer contact of said other relay, and said second normally open contact of the other relay being connected to one terminal of the other winding of said motor; and
the remaining terminals of said motor windings and said lamp being connected to the other side of said AC line;
whereby upon actuation of one relay said motor operates in one direction, upon actuation of the other relay said motor operates in the reverse direction, and upon actuation of both relays only said light operates.

* * * * *